United States Patent
Neubauer

(10) Patent No.: US 7,373,518 B2
(45) Date of Patent: May 13, 2008

(54) OPERATION OF A SECURITY MODULE IN A CARD READER

(75) Inventor: Lutz Neubauer, Bad Wünnenberg (DE)

(73) Assignee: Wincor Nixdorf International GmbH, Paderborn (DE)

( * ) Notice: Subject to any disclaimer, the term of this patent is extended or adjusted under 35 U.S.C. 154(b) by 840 days.

(21) Appl. No.: 10/258,272

(22) PCT Filed: Apr. 14, 2001

(86) PCT No.: PCT/DE01/01465

§ 371 (c)(1),
(2), (4) Date: Oct. 22, 2002

(87) PCT Pub. No.: WO01/86580

PCT Pub. Date: Nov. 15, 2001

(65) Prior Publication Data

US 2003/0084303 A1    May 1, 2003

(30) Foreign Application Priority Data

May 9, 2000    (DE) .................. 100 22 314

(51) Int. Cl.
*H04K 1/00* (2006.01)
(52) U.S. Cl. .................. 713/185; 713/182; 713/183; 713/184; 713/186; 726/2; 726/6; 726/20; 705/41; 705/42; 705/43; 705/65
(58) Field of Classification Search .................. 380/24; 705/41–67; 726/6, 2, 27, 20; 713/182–186; 715/65
See application file for complete search history.

(56) References Cited

U.S. PATENT DOCUMENTS

| 5,267,315 A | * | 11/1993 | Narita et al. .................. 705/67 |
| 5,577,121 A | * | 11/1996 | Davis et al. .................. 705/67 |
| 5,594,227 A | * | 1/1997 | Deo .......................... 235/380 |
| 5,987,438 A | * | 11/1999 | Nakano et al. ............... 705/41 |
| 6,092,202 A | * | 7/2000 | Veil et al. ...................... 726/27 |
| 6,226,749 B1 | * | 5/2001 | Carloganu et al. ............. 726/2 |
| 6,668,326 B1 | * | 12/2003 | Sella et al. ..................... 726/6 |

FOREIGN PATENT DOCUMENTS

| DE | 693 01 530 T2 | 7/1996 |
| WO | 97/10562 | 3/1997 |

OTHER PUBLICATIONS

Rankl Wolfgang, Effing Wolfgang, "Handbuch der Chipkarten", 1999, Carl Hanser Vrelag, Munchen Wien, XP 002174265, ISBN: 3-446-21115-2, pp. 595-612.

\* cited by examiner

*Primary Examiner*—Kim Vu
*Assistant Examiner*—Baotran N. To
(74) *Attorney, Agent, or Firm*—Michaud-Duffy Group LLP

(57) ABSTRACT

Card reader having a control interface 18 for controlling 12 the card reader from the exterior, and a device for reading data cards, particularly chip cards, and also having a security module 20, where a request arriving via the control interface 18 is forwarded to the security module 20, and the latter's output is reformatted, if appropriate, and is forwarded to the data card, where it is checked.

9 Claims, 1 Drawing Sheet

1

OPERATION OF A SECURITY MODULE IN A CARD READER

TECHNICAL FIELD

The invention relates to the flow control in card readers for magnetic or chip cards in which a security module is provided.

PRIOR ART

In many areas, particularly in self service appliances such as cash dispenser machines, cards in check-card or credit-card format are used which have magnetically coded tracks or electronic circuits produced in the card. The latter cards are commonly referred to as chip cards. When using these cards, card readers are required which can be used to make contact with the chip cards or to read the magnetically coded information on magnetic-strip cards.

Such card readers are also used, in particular, to ascertain the identity of a person using an appliance. For this purpose, the cards hold a coded password, also referred to as a PIN. Besides chip cards containing a cryptographic processor, there are also chip cards in use which do not allow the password to be read, but only allow it to be compared internally. These chip cards then require the password to be transmitted in plain text via the card reader's external interface which is provided.

It is therefore an object of the invention to specify a solution which does not require the password in plain text outside of the card reader.

DESCRIPTION OF THE INVENTION

The invention uses the insight that the object can be achieved by a security module in the card reader. For this purpose, an encrypted password is sent via the external interface, is sent to the security module, is decrypted there and is sent directly to the chip card, generally in recoded form.

Other features and advantages of the invention can be found in the description below, which explains the invention using an exemplary embodiment in conjunction with the appended drawings.

DESCRIPTION OF AN EMBODIMENT OF THE INVENTION

Figure 1:
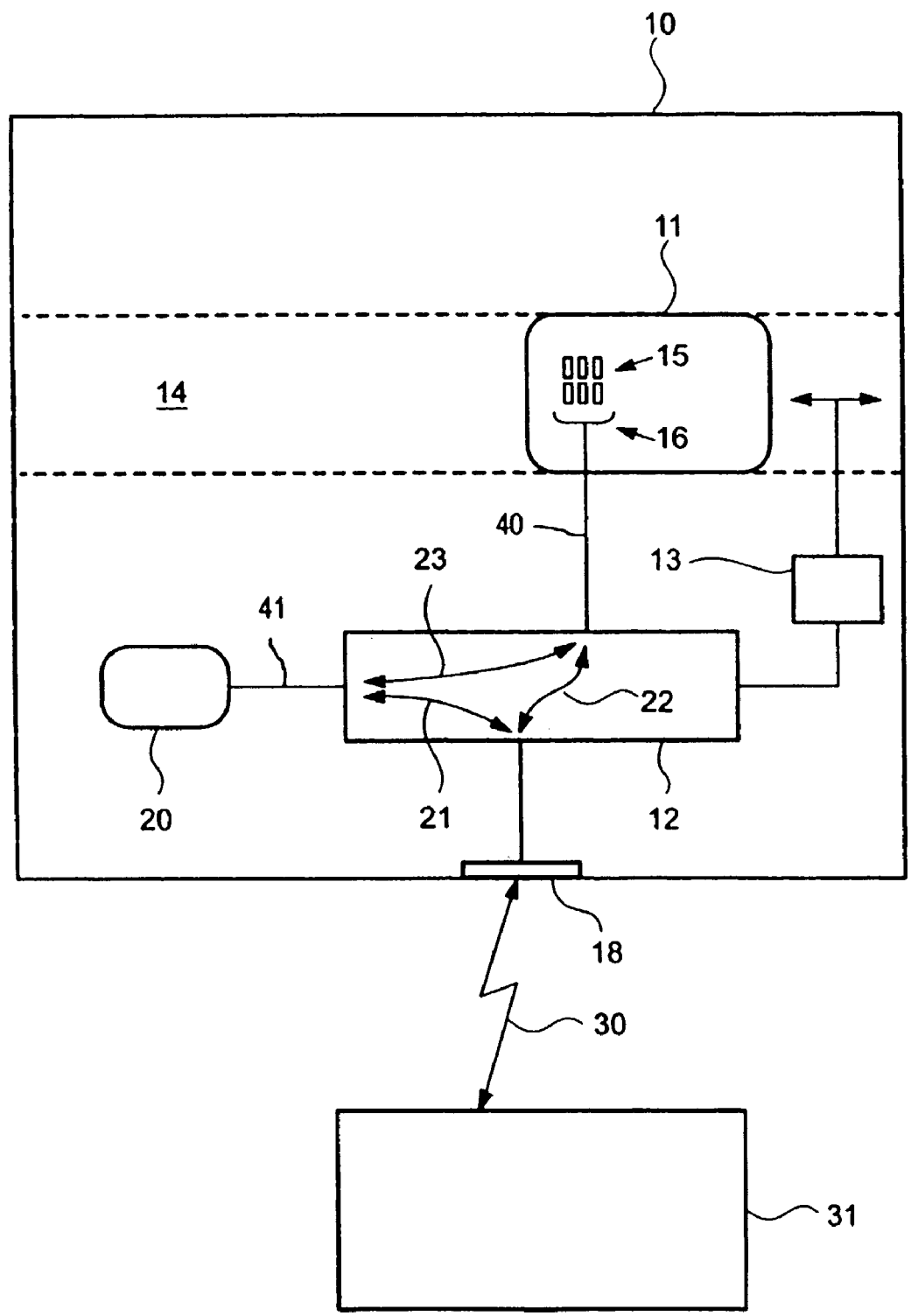
FIG. 1 shows a schematic illustration of components of a card reader in which the invention can be used.

FIG. 1 is a schematic illustration of a card reader 10 in which a card, in this case a chip card 11, can be moved and hence inserted and output in a guide channel 14. A controller 12 brings about this action using a drive 13. The chip card 11 has contacts 15 which are connected to mating contacts 16. This action is brought about by the controller 12, possibly together with the drive 13 and further means.

The card reader also comprises a security module 20 which is connected to the controller 12. This security module is designed such that an attempt to open it destroys the stored data. Such a security module 20 therefore stores, in particular, keys for symmetrical encryption methods. So as not to have to reveal the key, the security module decrypts, if appropriate, data which are transmitted to it via the connection by the controller 12. The interface for such a security module is frequently the same as that for a chip card. It can also be in the form of a chip card, which means that a second corresponding contact station is required. Preferably, however, a version for integrated circuits is used which is more reliable and takes up less space.

In addition, the card reader comprises a control interface 18 which is used to control the card reader. In many cases, this control interface 18 is in the form of a serial interface, known by the abbreviation 'V24'. FIG. 1 shows a superordinate controller 31 with a data transmission link 30 which operates this control interface 18.

Alternatively, such a card reader can also read cards having a magnetic track, which is not shown in FIG. 1. The contact unit 16 for this can be thought of as a magnetic reading head.

The inventive method is applied as follows, for example:

A chip card 11 belonging to a customer will be assumed to have been connected by the contact station 16. The chip card 11 contains a stored password, called a PIN in the field of banking. Although this password cannot be read, provision is made for the password to be sent to the chip card 11 in plain text and for said chip card 11 then to perform the check for identity.

The card readers known to date therefore require the password to be transferred to the control interface 18 in plain text in order for the controller 12 to forward it to the chip card. This path is symbolized by the curved double-headed arrow 22 inside the controller 12. However, the control interface 18 is frequently a standardized interface which is relatively simple to tap. In addition, the control interface 18 is frequently operated by a computer having a normal operating system, which could in turn be a target for attacks.

The card reader has access to a security module 20 which contains, in particular, a decryption section. This security module is operated via the control interface 18. In particular, an encrypted password is sent from the superordinate controller 31 to the security module 20 for the purpose of decryption, and the decrypted password is sent back via the control interface by the security module. This path is symbolized by the curved double-headed arrow 21 inside the controller 12. The superordinate controller 31 picks up the password and forms a further order to the controller 12 for the purpose of sending the decrypted password to the chip card 11.

The invention avoids transmitting the password via the control interface 18 twice by virtue of the controller 12 being designed such that the result returned by the security module 20 is forwarded, generally after reformatting, directly to the chip card. This path is symbolized by the curved double-headed arrow 23 inside the controller 12.

It will be assumed that the control interface has received a command which contains the password in encrypted form. This command is characterized, generally by means of a code field, such that it needs to be passed to the security module 20 and the result of the security module's handling must not be returned via the control interface, but rather can be forwarded only to the chip card. In this case, the result is precisely the decrypted password which is sent to the chip card. The chip card makes a comparison with the password stored on it and delivers a statement regarding whether there is a match. To support this operation, provision is made for a preliminary instruction to be used to specify, particularly by specifying a position and a length, where in the security module's response the decrypted password needs to be extracted. In the same or in a further preliminary instruction, the controller is notified of that coded instruction into which the extracted password needs to be fitted. This can be done by specifying a character string which needs to be placed in front and one which needs to be placed behind.

The password is preferably encrypted in the actual keypad unit into which the user enters the password or the PIN. This means that the area in which the password is visible in unencrypted form is limited to the interior of the keypad and of the card reader. The devices required for this purpose are already provided in the keypads on cash machines. If appropriate, recoding can also take place if the keypad and the security module have no common key. In this case, the cash machine's controller is connected to a central control station which has access to both keys in a secure environment and uses the keypad's key for decryption and uses the card reader's key for decryption within this secure environment.

In card readers having a magnetic track, the invention can be applied to the extent that the information needing to be compared with the magnetic track can be sent to the card reader in encrypted form, is decrypted by said card reader and is then compared directly in the card reader with the data read from the magnetic track. This means that the data are less exposed to an attack; an attacker planning an attack using a relatively large amount of magnetic track data must then get hold of these data physically. In this respect, the security is increased at least slightly.

The invention claimed is:

1. A method of operation for a card reader comprising:
   providing a controller having a control interface connected thereto for controlling the card reader; a card interface for chip cards which can be interchanged under operational conditions, the card interface being connected to the controller; a superordinate controller; and a security module having a module interface which is connected to the controller;
   generating an authorization request comprising instruction sequences at the superordinate controller;
   transmitting the authorization request and an encrypted password to the control interface;
   forwarding the authorization request to the security module;
   producing a decrypted password;
   generating an order at the superordinate controller for forwarding the decrypted password from the security module to the card interface;
   sending the order to the security module via the control interface;
   forwarding the decrypted password to the card interface;
   comparing, at the chip card, the decrypted password with a password stored on the chip card; and
   producing a statement indicating whether there is a match between the decrypted password and the password stored on the chip card.

2. The method of claim 1, wherein the chip card produces the statement indicating whether there is a match between the decrypted password and the password stored on the chip card.

3. The method of claim 2, further comprising using a preliminary instruction to send a data record to the controller via the control interface, said data record being forwarded to the chip card in combination with the decrypted password from the security module.

4. The method of claim 1 wherein the superordinate controller controls the card reader from a position external to the card reader.

5. A method of operation for a card reader comprising:
   providing the card reader which can be interchanged under operational conditions; a controller having a control interface connected thereto for controlling the card reader, a card interface for the card reader, the card interface being connected to the controller; a superordinate controller; and a security module having a module interface which is connected to the controller;
   inputting a magnetic track card in the card reader;
   generating an authorization request comprising instruction sequences at the superordinate controller;
   transmitting the authorization request and an encrypted password from the superordinate controller to the control interface;
   forwarding the authorization request to the security module;
   producing a decrypted password at the security module;
   generating an order at the superordinate controller for forwarding the decrypted password from the security module to the chip card;
   sending the order to the security module via the control interface;
   forwarding the decrypted password from the security module via the card interface to the card reader;
   comparing, at the card reader, the decrypted password with data read from the magnetic track card; and
   producing by the card reader, a statement indicating whether there is a match between the decrypted password and the data read from the magnetic track card.

6. The method of claim 5, further comprising using a preliminary instruction to send a data record to the controller via the control interface, said data record being forwarded to the card reader in combination with the decrypted password from the security module.

7. The method of claim 5 wherein the superordinate controller controls the card reader from a position external to the card reader.

8. A card reader system comprising:
   a controller having a control interface connected thereto for controlling the card reader system;
   a card interface for receiving chip cards, the card interface connected to the controller;
   a superordinate controller coupled to the controller via a data transmission link; and
   a security module connected to the controller;
   wherein the superordinate controller is configured to generate an authorization request comprising instruction sequences and to transmit the authorization request and an encrypted password to the control interface;
   wherein the control interface is configured to receive the authorization request and the encrypted password and to transmit the authorization request and the encrypted password to the security module;

wherein the security module is configured to receive the authorization request from the control interface, and decrypt the encrypted password;

wherein the superordinate controller is configured to send an order to the security module for forwarding the decrypted password to the card interface;

wherein upon receipt of the order, the security module is configured to transmit the decrypted password to the card interface;

wherein the card interface is configured to transmit the decrypted password to the chip card; and wherein the chip card is configured to compare the decrypted password with a password stored on the chip card and to generate a statement indicating whether there is a match between the decrypted password and the password stored on the chip card.

9. The card reader system of claim 8 wherein the controller comprises a control interface configured to receive the authorization request from a position external to the card reader.

* * * * *